INVENTOR.
VINCENT HENRY ARDIA
BY
Oscar B Brumback
ATTORNEY

March 24, 1959 V. H. ARDIA 2,879,015
MANUAL CONTROLLER FOR AN AUTOMATIC PILOT SYSTEM
Filed June 9, 1953 3 Sheets-Sheet 2
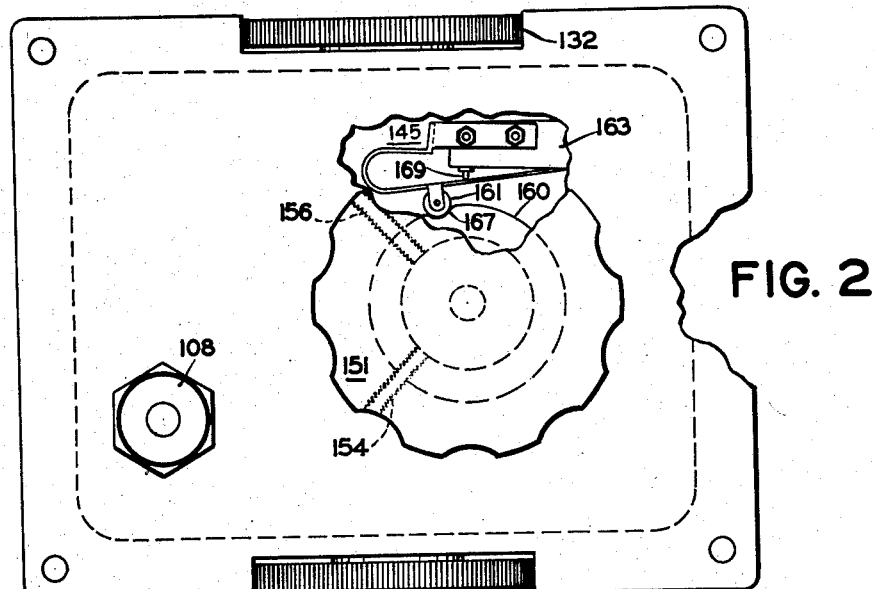
FIG. 2
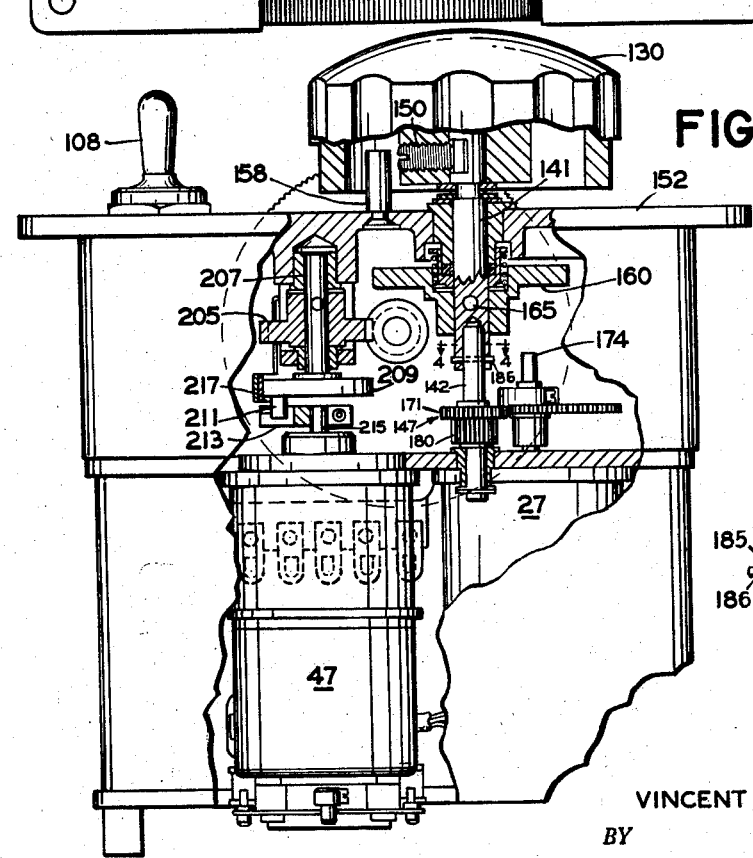
FIG. 3
FIG. 4
INVENTOR.
VINCENT HENRY ARDIA
BY
Oscar B. Brumbach
ATTORNEY March 24, 1959 V. H. ARDIA 2,879,015
MANUAL CONTROLLER FOR AN AUTOMATIC PILOT SYSTEM
Filed June 9, 1953 3 Sheets-Sheet 3

INVENTOR.
VINCENT HENRY ARDIA
BY
Oscar B Brumback
ATTORNEY

United States Patent Office 2,879,015
Patented Mar. 24, 1959

2,879,015

MANUAL CONTROLLER FOR AN AUTOMATIC PILOT SYSTEM

Vincent Henry Ardia, Franklin Lakes, N.J., assignor to Bendix Aviation Corporation, Teterboro, N.J., a corporation of Delaware Application June 9, 1953, Serial No. 360,489

7 Claims. (Cl. 244—77)

This invention relates generally to control systems for aircraft and more particularly to a system for manually controlling the automatic control system of an aircraft.

An object of the present invention is to provide a novel controller for manually controlling an aircraft through its automatic control system.

The present invention contemplates the provision in an automatic pilot system of a novel manual controller operable by one hand for controlling an aircraft in roll, yaw, and pitch in which the rotation of a knob turns the craft and disconnects the heading control, and the rotation of wheels changes its pitch attitude in which an interlock prevents the changing of the pitch attitude while a constant altitude maintaining means is effective for controlling the craft and which returns the craft to its original pitch attitude when the constant altitude maintaining means is rendered ineffective, the attitude control becoming centered when the automatic pilot system is disengaged from control of the aircraft.

The foregoing and other objects and advantages of the invention will appear more fully hereinafter from a consideration of the detailed description which follows, taken together with the accompanying drawing wherein one embodiment of the invention is illustrated by way of example. It is to be expressly understood, however, that the drawing is for the purpose of illustration and description only, and is not intended as a definition of the limits of the invention.

In the drawings wherein like parts are marked alike:

Figure 2 is a top plan view of the novel controller of Figure 1 with a section broken out to show the apparatus within it for disconnecting the heading control;

Figure 3 is an elevational side view of the novel controller of Figure 2 with sections broken out to show the pitch signal generator actuating mechanism;

Figure 4 is a sectional view taken along lines 4—4 of Figure 3;

Figure 1:
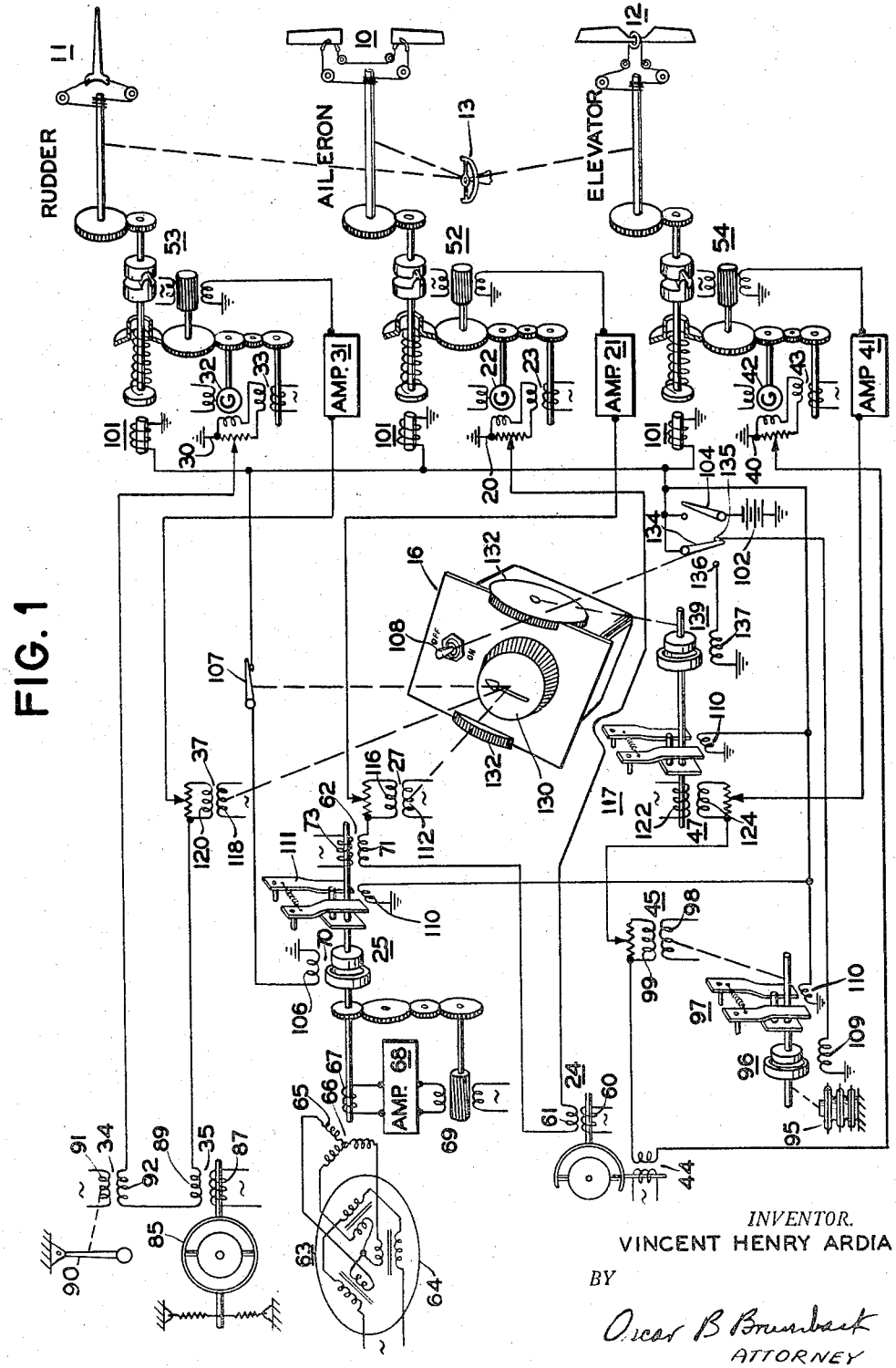
Figure 1 is a schematic diagram showing the novel manual controller of the present invention in operative association with an automatic pilot system for aircraft.

While the novel controller of the present invention may be used with any automatic pilot system with appropriate modification, the automatic pilot system illustrated diagrammatically herein is generally similar to that described in U.S. Patent No. 2,625,348 issued January 13, 1953, to Noxon et al. in which aileron 10, rudder 11, and elevator 12 may be controlled by hand either directly through a conventional controller 13 or through the automatic pilot system by the novel manual controller 16 of the present invention.

The automatic pilot system stabilizes the craft about its roll, yaw and pitch axes. In the roll channel in sequence from ground lead 20 to amplifier 21, the inductive signal generators for control of the craft are rate generator 22, follow-up signal generator 23, bank attitude signal generator 24, master direction indicator 25, and the yaw control signal generator 27 of the novel manual controller. In the yaw channel from ground lead 30 to amplifier 31 the inductive signal generators in sequence are rate generator 32, follow-up signal generator 33, a dynamic vertical signal developing inductive device 34, a rate of turn signal generating inductive device 35, and a yaw control signal generating device 37 of the novel manual controller. From ground lead 40 to amplifier 41, the inductive signal generators in sequence for control about the pitch channel are a rate generator 42, a follow-up device 43, a pitch attitude signal generator 44, an altitude control signal generator 45, and a pitch control signal generator 47 of the novel manual controller.

Amplifiers 21, 31, and 41, rate generators 22, 32 and 42, follow-ups 23, 33 and 43, and the servomotors 52, 53 and 54 may be identical. The servomotors may be induction motors, each having a fixed phase winding continuously energized by a source of alternating current and a variable phase winding energized by the output of its associated amplifier.

In an amplifier, a command signal is discriminated as to phase and amplified to a level sufficient to operate a servomotor. The servomotor drives a rate generator which may be of conventional type, having a rotor turned by the servomotors, a winding continuously energized by an alternating current, and a winding in which a signal is induced corresponding in amplitude and phase to the direction and rate of rotation of the rotor. The follow-up device also may be a conventional inductive signal generator having a rotor winding displaceable from a null position relative to a stator winding to develop a signal in the stator winding corresponding in amplitude and phase to the extent and direction of displacement. Depending upon the phase of a reference signal to an amplifier in any of the control channels, the servomotor will rotate in a clockwise and counterclockwise direction while the motor displaces the rotor winding of its associated follow-up device relative to its inductively coupled stator winding to develop a signal opposite in phase to the reference signal causing the motor to operate. As the continued operation of the servomotor increases the amplitude of the follow-up signal, the reference signal is reduced and finally cancelled. With a net input signal to the amplifier of zero, the motor stops. The rate generator whose rotor is also driven by the servomotor develops a signal whose amplitude corresponds to the rate of rotation of the motor. This signal damps the operation of the motor so that the inertia stored as kinetic energy in the moving parts will not cause the motor to overrun its assigned position.

A displacement of the craft in roll displaces the rotor 60 of bank attitude signal generator 24 relative to its stator 61 developing a bank attitude reference signal whose amplitude and phase correspond, respectively, to the extent of the bank angle with respect to a predetermined bank attitude, and to the direction, left or right, of the banking. This signal reaches amplifier 21 unaffected by the remaining signal generators when they are at their normal null positions.

In amplifier 21, the phase of the reference signal is detected and the signal amplified to an extent to energize the variable phase winding of servomotor 52. The servomotor runs until the signal of follow-up device 23 builds up an amplitude equal and opposite to that of the attitude signal whereupon the servomotor stops.

Should the aircraft deviate from a desired heading, a signal is developed in inductive device 62 corresponding to this deviation. As a transmitter, the pick-up device 63 in an earth inductor compass system 64 develops a signal corresponding to the magnetic heading of the craft. This signal is reproduced at the stator 65 of inductive receiver device 66. When rotor 67 is displaced from a null position with respect to the field of stator 65, the rotor develops a signal corresponding to displacement from the null. After amplification in amplifier 68, this signal energizes a motor 69 which drives rotor winding 67 to a null position. When a magnetic clutch 70 is engaged, motor 69 also displaces a rotor winding 71 of inductive device 62 relative to its stator winding 73 to develop the signal corresponding to the displacement of the craft from the desired heading. This signal actuates servomotor 52 to bank the aircraft, to return the craft to the desired heading and maintain it there.

The yaw control channel follows the turning of the aircraft to displace rudder 11 to coordinate the turning which results from the banking of the craft. The aircraft develops a rate of turning as it makes a turn, and a conventional rate of turn gyro 85 responds to this rate of turning and displaces the rotor winding 87 of inductive device 35 relative to its stator 89 to develop a corresponding reference signal. After amplification and detection as to phase in amplifier 31, this signal energizes the variable phase winding of servomotor 53. The rotation of the shaft of servomotor 53 displaces the rotor winding of follow-up signal generator 33 relative to its stator to develop a follow-up signal whose amplitude is built up until it is equal and opposite to the amplitude of the reference signal. At this time, the net input signal to amplifier 31 is zero and the servomotor stops.

Should the aircraft slip or skid during the turning, the normal vertical is displaced from the dynamic vertical correspondingly. Dynamic vertical sensor 90 which may be a damped pendulum, senses this displacement and correspondingly displaces rotor winding 91 of signal developing device 34 relative to its stator winding 92. This signal from inductive device 34 actuates motor 53 to displace rudder 11 to coordinate the turning.

Deviation of the craft from a desired pitch attitude develops a corresponding reference signal at inductive device 44. After amplification in amplifier 41, this signal operates servomotor 54. The operation of servomotor 54 displaces the rotor of follow-up device 43 relative to its stator to develop a signal whose amplitude builds up until it is equal and opposite to the pitch attitude signal. At this time, servomotor 54 stops.

Due to up-drafts, down-drafts, or change in throttle setting, the craft may change altitude without a change in attitude. Therefore, an altitude control is provided to maintain the craft at a desired altitude. This control may be similar to that described in U.S. Patent No. 2,512,902, issued June 27, 1950, to Rossire wherein a barometric responsive aneroid 95 through a magnetic clutch 96 and centering levers 97, displaces rotor winding 98 of inductive device 45 relative to stator 99 to develop a signal corresponding in amplitude and phase to the extent and direction of the deviation of the craft from the altitude at which magnetic clutch 96 is engaged. This signal actuates motor 54 to maintain the craft at the desired altitude.

Solenoid actuated clutches 101 must be engaged for servomotors 52, 53 and 54 to move their related control surface. Energy from a suitable source such as battery 102 by way of a control switch 104 engages the faces of these clutches. When switch 104 is in a closed circuit position, energy is also fed to the engaging coil 106 of magnetic clutch 70 in the master direction indicator when a switch 107 is in a closed circuit position; and when lever 108 of manual controller 16 is in an "on" position for the altitude control, to engage coil 109 of magnetic clutch 96. Energy is also fed to solenoid coils 110 so that the centering levers 97 and 117 will not center the rotors of their associated inductive devices until the automatic pilot system is disengaged.

The operation of the signal generator devices of the manual controller is as follows.

The displacement of rotor 112 of inductive device 27 of manual controller 16 from a null position relative to stator 116 develops a corresponding signal in the stator. This signal actuates the servomotors to move the ailerons until the signal which develops in follow-up device 23 becomes equal and opposite to this signal whereupon the motor stops. As the applied ailerons bank the craft, the roll attitude signal from inductive device 24 increases in amplitude. As the amplitude of the attitude signal gradually becomes equal and opposite to the signal from inductive device 27 and balances it, the follow-up signal gradually returns the ailerons to their normal streamlined position and the craft maintains this banked condition until rotor 112 is brought back to a null position.

In a similar manner, a displacement of rotor 118 of inductive device 37 in the manual controller develops in stator winding 120 a corresponding signal which actuates servomotor 53 to move the rudder to a position such that an equal and opposite signal is developed by follow-up device 33. As the applied rudder causes the craft to develop a rate of turn, the rate of turn gyro 85 responds and develops a signal at inductive device 35 to balance the signal at inductive device 37. As these two signals balance, the follow-up signal returns the rudder to its normal position, and the craft is maintained at the rate of turn where the signals from the inductive devices are balanced.

Similarly, a displacement of rotor 122 of inductive device 47 develops at stator 124, a signal which actuates servomotor 54 to move the elevators to a position such that an equal and opposite signal is developed by follow-up device 43. As the applied elevator places the craft in a pitch attitude where the attitude signal from inductive device 44 balances the signal from inductive device 47, the signal from follow-up 43 returns the elevators to a normal position and the craft is maintained at this attitude.

The heading control developed by master direction indicator 25 would tend to oppose the turning of the craft. Therefore a switch 107 is provided for deenergizing magnetic clutch 70. Thus, the rotor of inductive device 72 will not be moved as motor 69 moves rotor 67 in following the turning of the craft.

The parts so far described are known in the art and are intended to represent a conventional automatic pilot system.

Turning now to the novel controller of the present invention, the manually operable portion is comprised generally of a turn knob 130, pitch wheels 132 and toggle switch 108. A turning of knob 130 displaces rotor windings 112 and 118 of inductive devices 27 and 37 relative to their stators 116 and 120 to develop signals for the roll and yaw control channels for turning the craft. At the same time, switch 107 is moved to open the circuit from battery 102 to coil 106 of magnetic clutch 70. This deenergizes clutch 70 and prevents the heading control signal from opposing the turning. In response to the signals from inductive devices 27 and 37, servomotors 52 and 53 move ailerons 10 and rudder 11 to place the craft in a coordinated bank turn. When knob 130 is manually recentered, rotors 112 and 118 are returned to their null position and switch 107 to a closed circuit position, engaging magnetic clutch 70 to maintain the craft on the new heading.

To maintain the craft at a constant altitude, toggle switch 108 is moved to an "on" position. Armature 134 at this time engages contact 135; coil 109 of magnetic clutch 96 is energized; and any deviation of the craft from this altitude will develop a corresponding signal in inductive device 45 to energize servomotor 54 to maintain the craft at this altitude. The disengagement of armature 134 from contact 136 deenergizes a solenoid coil 137. This disengages a magnetic clutch 139 so that the turning of pitch wheels 132 will not affect inductive device 47.

When switch 108 is moved to the "off" position, coil 109 of magnetic clutch 96 is deenergized and the altitude control cannot operate upon servomotor 54 but movement of pitch wheels 132 will displace rotor winding 122 relative to stator winding 124 to develop a signal to actuate motor 54 and change the pitch attitude of the craft.

Figure 5:
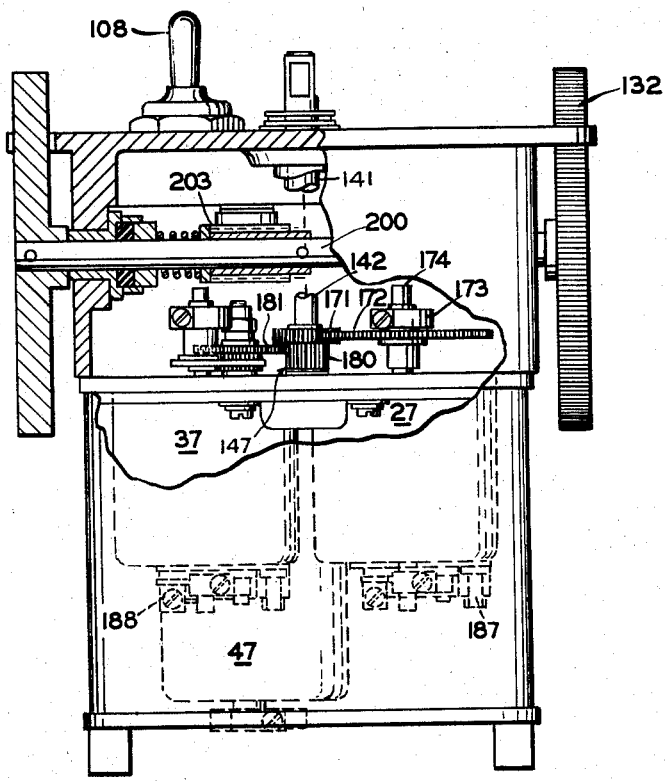
Figure 5 is an elevational end view of the novel controller of Figure 2 with sections broken out to show the bank and yaw signal generator actuating mechanism.

Referring to Figure 3 for details of construction, the turn control of the system is comprised generally of knob 130, shafts 141 and 142, heading control disconnecting device 145, Figure 2, a gear 147 and inductive devices 27 and 37, Figure 5.

The turn knob 130 may be a circular member secured by set screw 150 to shaft 141 which is rotatable in a frame 152. Stops 154 and 156 on knob 130 coact with a pin 158 fixed to frame 152 to limit the rotation of knob 130 to a predetermined range.

The heading control disconnecting device 145 is comprised of a cam 160, a roller 161 and a switch 163. Cam 160 is pinned at 165 to shaft 141. Upon a turning of shaft 141, roller 161 moves out of a recess 167 and depresses a post 169 of a conventional switch 163 which includes armature 107. This disconnects the heading control and maintains it disconnected until such time as the knob 130 is again centered and roller 161 moves into recess 167 permitting the moving of armature 107 to a closed circuit position so that magnetic clutch 70 is engaged again.

Figure 6:
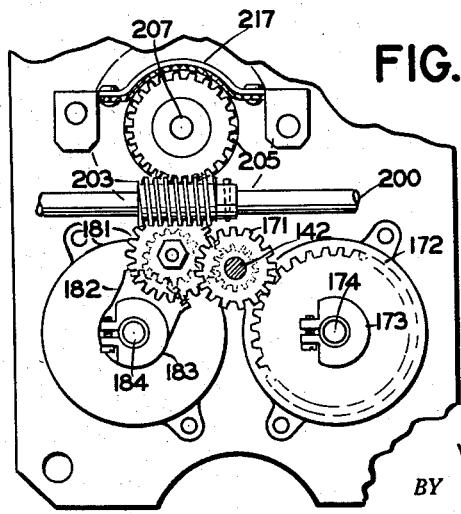
Figure 6 is an internal plan view of a portion of Figure 5 showing details of the gearing therein.

Shaft 141, which is the input shaft for manual controller 16, drives gear 147 through the shaft 42. As best shown in Figures 5 and 6, the gear 147 has two pinions: pinion 171 for driving a gear 172 that is fixed by a bracket 173 to the shaft 174 of the rotor winding 112 of inductive device 27; and pinion 180 drives for driving idler gear 181 which drives a sector gear 182 that is fixed by bracket 183 to the shaft 184 of rotor winding 118 of inductive device 37. Thus, as shaft 142 is turned, gears 172 and 182 are turned correspondingly.

Shafts 141 and 142 may be connected by a pin and slot joint as shown in Figure 3 or such connection may be dispensed with by providing a single integral shaft in place of the connected shafts.

When shafts 141 and 142 are integral, a displacement of knob 130 from a centered position as denoted by the arrow thereon, turns cam 160 and gear 147. As recess 167 moves, roller 161 is moved outwardly, depressing post 169 and deenergizing coil 106 of magnetic clutch 70 in master direction indicator 25. This disengages clutch 70 to render the heading control ineffective on the automatic pilot system. Pinions 171 and 180 drive gears 172 and 182 displacing rotor windings 112 and 118 correspondingly. This develops signals for the roll and yaw channels to turn the craft. When knob 130 is centered, the rotor windings are returned to their normal null positions and roller 161 drops into recess 167 energizing clutch 70 to permit the heading control to maintain the craft on the new heading.

A disadvantage that may be experienced with the two shafts being integral is that should a turn correction be made rapidly, a signal may build up the roll and yaw signal developing devices 27 and 37 before the master direction indicator clutch 70 has actually disengaged. When a disengagement of the clutch does occur, these signals are suddenly applied to the roll and yaw servomotors causing the craft to lurch.

A lost motion connection between shafts 141 and 142 overcomes the foregoing disadvantage. In this connection, as shown in Figures 3 and 4, shaft 141 is provided with a slot 185 and shaft 142 has a coacting pin 186 projecting through the slot. Referring to Figure 4, the slot is substantially larger than the pin so that an angular motion of shaft 141 occurs before a wall of the slot 185 engages pin 186.

Referring now to Figure 3, as know 130 is turned, shaft 141 will be angularly displaced and roller 161 on cam 160 will ride out of its recess 167, depressing the post 169 and rendering the heading control signal generator 62 ineffective on the craft. After a further displacement, a wall of the slot 180 of shaft 141 will engage pin 181 projecting from shaft 142 and start turning shaft 142. The gear 147 actuated by shaft 142 will then correspondingly displace the rotor windings in the bank and yaw signal generators 27 and 37. The directional control has been disconnected first so no lurching will be experienced when the signals from the roll and yaw signal generators are applied to the system.

Because of the lost motion due to pin 186 and slot 185, the possibility arises that knob 130 may be in a centered position and the bank and yaw pitch signal generators may not be in a centered position. Therefore, centering devices 187 and 188 are provided to return the yaw and roll signal generators to their centering position. These centering devices may be similar to centering devices 97 and 117 which are described more fully in copending application Serial No. 154,567 filed April 7, 1950, and assigned to the assignee of the present invention. Briefly described, a pair of pivotally connected lever arms are spaced on either side of the rotor shaft and are interconnected by a tension spring. Upon a rotation of the rotor shaft, a pin on a bracket fixed to the shaft moves one lever outwardly against the tension of the spring. When the turning torque is released, the tension spring returns the pin as well as the rotor shaft to a centered position. This centering device through gear 147 maintains pin 186 at a centered position when knob 130 is returned to its centered position.

Turning to the pitch control channel, when switch 108 is moved to the "off" position, wheels 132 may be moved to control the craft attitude. Shaft 200 connects wheels 132 so that either wheel will turn a worm gear 203 pinned to shaft 200. This worm gear turns a pinion 205 whose shaft 207 terminates in a brakedrum 209. A pin 211 projects from drum 209 to engage the slot of a bracket 213 fixed to the shaft 215 carrying the rotor winding 122 of inductive device 47. A metallic strip 217 with suitable friction lining bears against the brakedrum to hold it in position. The shaft of signal generator 47 is made of two portions connected together by clutch 139. The faces of this clutch are made of magnetic material and are engaged by coil 137.

Referring to Figure 1, when lever 108 is at an "off" position, coil 137 is energized and the faces of clutch 139 are engaged. Any movement of pitch wheels 132 is transmitted to the rotor winding 122 of inductive device 47. At this time, magnetic clutch 96 between aneroid 95 and inductive device 45 is deenergized so that no signal is developed in the inductive device by the movement of the aneroid.

When switch 108 is moved to the "on" position, magnetic clutch 139 is deenergized. Any subsequent turning of wheels 132 will not displace rotor winding 122 of inductive device 47. Magnetic clutch 96, however, is engaged so that any deviation of the aircraft thereafter from this engaged altitude will result in a corresponding signal being developed in inductive device 45 to control servomotor 54 to bring the craft back to the engaged altitude.

Signal generator 47 in the manual controller also has centering device 117 which may be similar to that described above. So that the craft may be returned to its initial pitch attitude after the altitude control is disengaged, a solenoid 110 maintains the centering levers 220 ineffective until the automatic pilot system is disengaged from control of the aircraft surfaces whereupon this solenoid is deenergized and the centering levers return the pitch signal generator to its centering position.

The foregoing has presented a novel manual controller for controlling the flight of an aircraft through its automatic control system. The controller may be operated by one hand to control the pitch attitude and the turning of the aircraft. An interlock is provided so that the pitch attitude of the craft may not be changed by the manual controller while a constant altitude maintaining device is effective to control the craft. Lost motion means may be provided so that directional control is made ineffective before bank and yaw control is applied to the automatic pilot system. This permits the craft to be maneuvered into a turn smoothly.

Although only one embodiment of the invention has been illustrated and described in detail, it is to be expressly understood that the invention is not limited thereto. Various changes can be made in the design and arrangement of the parts without departing from the spirit and scope of the invention as the same will now be understood by those skilled in the art.

What is claimed is:

1. A controller for an automatic pilot system having a heading control and a turn control, comprising an angularly movable member, first means connected with said heading control for rendering the latter ineffective, second means connected with said turn control for actuating the latter, and means connecting said movable member and said first and second means and actuable by the angular movement of said member for operating said first and second means, said last named means including lost motion means between said first and second means whereby greater angular movement is required to actuate said second means than to actuate said first means.

2. A controller for an automatic steering system having roll, yaw, and heading controls for maintaining straight and level flight of an aircraft, comprising a displaceable member movable from a reference position, means operatively connected with said displaceable member and said heading control for rendering the latter ineffective upon movement of said displaceable member from said reference position, and means operatively connected with said displaceable member and roll and yaw controls for altering the output of the roll and yaw controls to effect a turning of the aircraft and including lost motion means whereby such output of the roll and yaw controls is altered due to movement of the displacement member only after the heading control has been rendered ineffective.

3. A controller for an automatic steering system having roll, yaw, and heading controls for maintaining straight and level flight, comprising a displaceable member angularly movable from a reference position, means operatively connected with said displaceable means and said heading control for rendering the latter ineffective upon an angular movement of said displaceable member from reference position, means connected with said roll and yaw controls for altering the output of the latter controls for turning the craft, and lost motion means connecting said displaceable member and said last-named means whereby upon movement of said displaceable means from reference position the heading control is rendered in effective and after further displacement the outputs of said roll and yaw controls are altered to turn the craft.

4. A controller for an automatic steering system having roll, yaw, and heading controls for maintaining straight and level flight, comprising a displaceable member movable from a reference position, means operatively connected with said displaceable member and said heading control for rendering the latter ineffective upon movement of said displaceable member from reference position, means connected with said roll and yaw controls for altering the output of said controls, and lost motion means including a pin and slot connection having a slot substantially larger than the pin connecting said displaceable member and said roll and yaw control altering means.

5. A controller for an automatic steering system having roll, yaw, and heading controls for maintaining straight and level flight, comprising a knob rotatable from a reference position, cam means operatively connected with said knob and said heading control for rendering the latter ineffective upon movement of said knob from reference position, means connected with said roll and yaw controls for altering the output of said controls, and lost motion means connecting said knob and said last-named means whereby upon rotation of said knob from reference position the heading control is rendered ineffective and after further rotation the output of said roll and yaw controls are altered.

6. A controller for an automatic steering system having roll, yaw, and heading controls for maintaining straight and level flight, comprising a knob rotatable from a reference position, cam means operatively connected with said knob and said heading control for rendering the latter ineffective upon movement of said knob from reference position, means connected with said roll and yaw controls for altering the output of said controls, and lost motion means including a pin and slot connection having a slot substantially larger than the pin connecting said knob and said last-named means whereby upon rotation of said knob from reference position the heading control is rendered ineffective and after further rotation the output of said roll and yaw controls are altered.

7. A controller for an automatic steering system having a heading control and a turn control for maintaining straight and level flight of an aircraft, comprising a displaceable member movable from a reference position, means operatively connected with said displaceable member and said heading control for rendering the latter ineffective upon movement of said displaceable member from said reference position, and means operatively connected with said displacable member and turn control for altering the output of the turn control to effect a turning of the aircraft and including lost motion means whereby such output of the turn control is altered due to movement of the displacement member only after the heading control has been rendered ineffective.

References Cited in the file of this patent
UNITED STATES PATENTS 2,636,699   Jude et al. _____ Apr. 28, 1953